United States Patent [19]
Catherwood et al.

[11] Patent Number: 5,854,944
[45] Date of Patent: Dec. 29, 1998

[54] METHOD AND APPARATUS FOR DETERMINING WAIT STATES ON A PER CYCLE BASIS IN A DATA PROCESSING SYSTEM

[75] Inventors: Michael I. Catherwood, Austin, Tex.; Norrie R. Robertson, Clarkston; Gordon W. McKinnon, Haxelwood, both of Scotland

[73] Assignee: Motorola, Inc., Schaumburg, Ill.

[21] Appl. No.: 645,014

[22] Filed: May 9, 1996

[51] Int. Cl.$^6$ .................................................. G06F 13/00
[52] U.S. Cl. .................... 395/879; 395/280; 395/287; 395/551; 395/555; 395/559; 395/878
[58] Field of Search .................... 395/287, 879, 395/280, 551, 555, 559, 878

[56] References Cited

U.S. PATENT DOCUMENTS

| | | | |
|---|---|---|---|
| 3,737,637 | 6/1973 | Frankeny et al. | 235/153 A |
| 4,050,096 | 9/1977 | Bennet et al. | 364/200 |
| 4,096,571 | 6/1978 | Vander Mey | 364/200 |
| 4,692,895 | 9/1987 | Huffman | 364/900 |
| 4,788,660 | 11/1988 | Arizono | 364/900 |
| 4,816,996 | 3/1989 | Hill et al. | 364/200 |
| 4,958,277 | 9/1990 | Hill et al. | 364/200 |
| 5,151,986 | 9/1992 | Langan et al. | 395/550 |
| 5,155,812 | 10/1992 | Ehlig et al. | 395/275 |
| 5,201,036 | 4/1993 | Yoshimatsu | 395/325 |
| 5,239,641 | 8/1993 | Horst | 395/550 |
| 5,253,355 | 10/1993 | Grieff | 395/425 |
| 5,261,073 | 11/1993 | Mann | 395/425 |
| 5,313,621 | 5/1994 | Chan | 395/550 |
| 5,313,648 | 5/1994 | Ehlig et al. | 395/800 |
| 5,448,744 | 9/1995 | Eifert et al. | 395/800 |
| 5,493,656 | 2/1996 | Tsukamoto | 395/280 |
| 5,498,981 | 3/1996 | Fukushige | 326/93 |
| 5,530,906 | 6/1996 | Cho et al. | 395/881 |
| 5,581,503 | 12/1996 | Matsubara | 365/185.33 |
| 5,581,745 | 12/1996 | Muraoka et al. | 395/557 |
| 5,619,669 | 4/1997 | Katsuta | 395/405 |
| 5,623,648 | 4/1997 | Childs | 395/557 |
| 5,732,250 | 3/1998 | Bates et al. | 395/559 |
| 5,740,382 | 4/1998 | Woodbridge et al. | 395/293 |
| 5,740,404 | 4/1998 | Baji | 395/494 |
| 5,761,532 | 6/1998 | Yarch et al. | 395/842 |

FOREIGN PATENT DOCUMENTS

| | | | |
|---|---|---|---|
| 0 432 575 A2 | 6/1991 | European Pat. Off. | G06F 13/42 |
| 0 437 276 A2 | 7/1991 | European Pat. Off. | G06F 13/42 |
| 0 487 910 A1 | 6/1992 | European Pat. Off. | G06F 13/42 |

OTHER PUBLICATIONS

Motorola, Inc., MC68332 User's Manual, Chapter 4: System Integration Module, pp. 4–27 through 4–46.

*Primary Examiner*—Meng-Ai T. An
*Assistant Examiner*—Valerie Darbe
*Attorney, Agent, or Firm*—Susan C. Hill

[57] ABSTRACT

Method and apparatus in a data processing system (10) for determining wait states on a per cycle basis. The present invention provides a wait state value (39) to a data processing system (10) indicating the number of wait states for each bus cycle. In one embodiment, a wait state pulse (81) is provided by data processing system (10), during which the wait state value (39) is provided to data processing system (10) by way of data bus (82). In response to the wait state value (39), data processing system (10) inserts a number of wait states corresponding to the wait state value (39) during the present bus cycle. In one embodiment of the present invention, a chip select signal (73) is combined with a portion of the address (83) to further partition the address range of the chip select signal (73).

22 Claims, 6 Drawing Sheets

METHOD AND APPARATUS FOR DETERMINING WAIT STATES ON A PER CYCLE BASIS IN A DATA PROCESSING SYSTEM

REFERENCE TO RELATED APPLICATIONS

The present application is related to the following U.S. patent applications:

"System And Method For Avoiding Bus Contention On A Multiplexed Bus", invented by Don Tietjen, et al, having Ser. No. 08/519,030, filed Aug. 24, 1995, and assigned to the assignee hereof; and "Method And Apparatus In A Data Processing System For Selectively Inserting Bus Cycle Idle Time", invented by Oded Yishay et al., having Ser. No. 08/600,144, filed Feb. 12, 1996, and assigned to the assignee hereof.

FIELD OF THE INVENTION

The present invention relates in general to a data processing system, and more particularly to a method and apparatus in a data processing system for determining wait state on a per cycle basis.

BACKGROUND OF THE INVENTION

Data processing systems, such as a microcomputer integrated circuit, are used with a wide range of peripheral devices, for example memory integrated circuits and application specific integrated circuits (ASICs). After an external bus access to a peripheral, some peripheral devices respond quickly and other peripheral devices respond more slowly.

Typically a data processor operates significantly faster than the slowest peripheral in the system. For example, for a read access, a slow peripheral device cannot provide data to a data processor which is operating at a higher frequency. Some existing data processing systems have addressed the problem by inserting a predetermined number of wait states. Wait states allow the peripheral to communicate with the data processor, which waits until the peripheral has completed performance. Unfortunately, however, this approach wastes a significant amount of time when both slow and fast peripheral devices must be accessed by a data processing system. Note also, that slow peripheral devices require the extended delays, while fast peripheral devices do not require extended delays. By applying wait states to all peripherals based on the frequency of the slowest peripheral, valuable bus time is wasted.

Other data processing systems use multiple chip select signals to determine the length of delay for each peripheral. However, the number of chip select pins required increases with the complexity and number of peripherals used.

DESCRIPTION OF THE PREFERRED EMBODIMENTS

The present invention allows a data processing system 10 (see FIG. 1) to selectively insert zero, one, or more wait states during a bus cycle on bus 28 in order to accommodate both slow and fast peripherals. The number of wait states inserted may be determined by a wait state value provided to data processing system 10 from a source external to data processing system 10 (see FIGS. 5 and 6). Thus a data processing system 10 can increase the overall performance and speed of a system (e.g. system 200 in FIG. 5, or system 300 in FIG. 6) by selectively inserting the minimum required number of wait states (i.e. a larger number of wait states during each bus cycle accessing a slow peripheral device, and no wait states or a smaller number of wait states during each bus cycle accessing a faster peripheral device). In this manner, overall system performance is increased without wasting valuable bus time performing unnecessary wait states. Thus using the present invention, the optimum number of wait states may be inserted by data processing system 10 during each bus cycle, depending upon the speed of response of the particular peripheral device which is being accessed. Of course, more wait states are needed for peripherals with slower response times, and fewer or no wait states are needed for peripherals with faster response times.

The present invention provides a way for a wait state value to be provided to data processing system 10 from external to data processing system 10 during each bus cycle. Data processing system 10 then uses the wait state value to determine the number of wait states to be inserted during that same bus cycle. In one embodiment of the present invention, the wait state value is provided to data processing system 10 by way of a portion of the data bus terminals 82 of data processing system 10. Note that for non-multiplexed busses, there is an initial portion of each bus cycle during which data is not driven on the data bus. Alternate embodiments of the present invention may use any terminals of data processing system 10 to provide the wait state value to data processing system 10. In one embodiment of the present invention, data processing system 10 generates chip select signals that are provided external to data processing system 10. However, alternate embodiments of the present invention may not use on-board chip select generation.

Prior art data processing systems exist which allow a different number of wait states to be programmed for each chip select. However, if a same chip select signal is used as part of the decode for multiple peripheral devices, as illustrated in the examples in FIGS. 5 and 6, all of the peripheral devices using that same chip select signal are forced to use the same number of wait states, as there is only one programmable wait state number for each chip select. The present invention provides a way to use a same chip select signal as part of the decode for multiple peripheral devices, and yet still allow each of those peripheral devices to select a different number of wait states on a per bus cycle basis. The present invention allows external circuitry (e.g. tri-state buffer 60 in FIGS. 5 and 6) to provide a different wait state value to data processing system 10 during each bus cycle, regardless of any chip select values. Data processing system 10 then uses this wait state value to determine the number of wait states to be inserted during that bus cycle.

The term "wait state(s)", as used in this document, is an extra period of time added during a bus cycle to extend the duration of the bus cycle. Wait state(s) are normally required by slow responding peripheral devices. When the wait states during a bus cycle have completed, the bus cycle can continue.

Note that the purpose served by adding idle time at the end of a bus cycle is significantly different than the purpose served by adding wait states in the middle of a bus cycle. The purpose of wait states is to increase the time period between the address value being valid and the data value being valid on the bus. Some peripherals require a significant time interval between receiving an address value and responding with a data value. The data processing system must wait an extra amount of time (i.e. for one or more wait states) after providing the address value and before determining the data value from the bus. If the data processing system does not wait long enough, the peripheral may not have had a sufficient amount of time to drive the bus with the data value, and the data processing system may read an incorrect data value.

Thus the purpose served by wait states is not to prevent bus contention, but to prevent the data processing system from receiving incorrect data. And unlike idle clocks, which are only inserted at the end of a bus cycle, wait states are inserted in the middle of a bus cycle between the transfer of the address value and the transfer of the data value.

The term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one. The symbol "%" preceding a number indicates that the number is represented in its binary or base two form.

DESCRIPTION OF THE FIGURES

Figure 1:
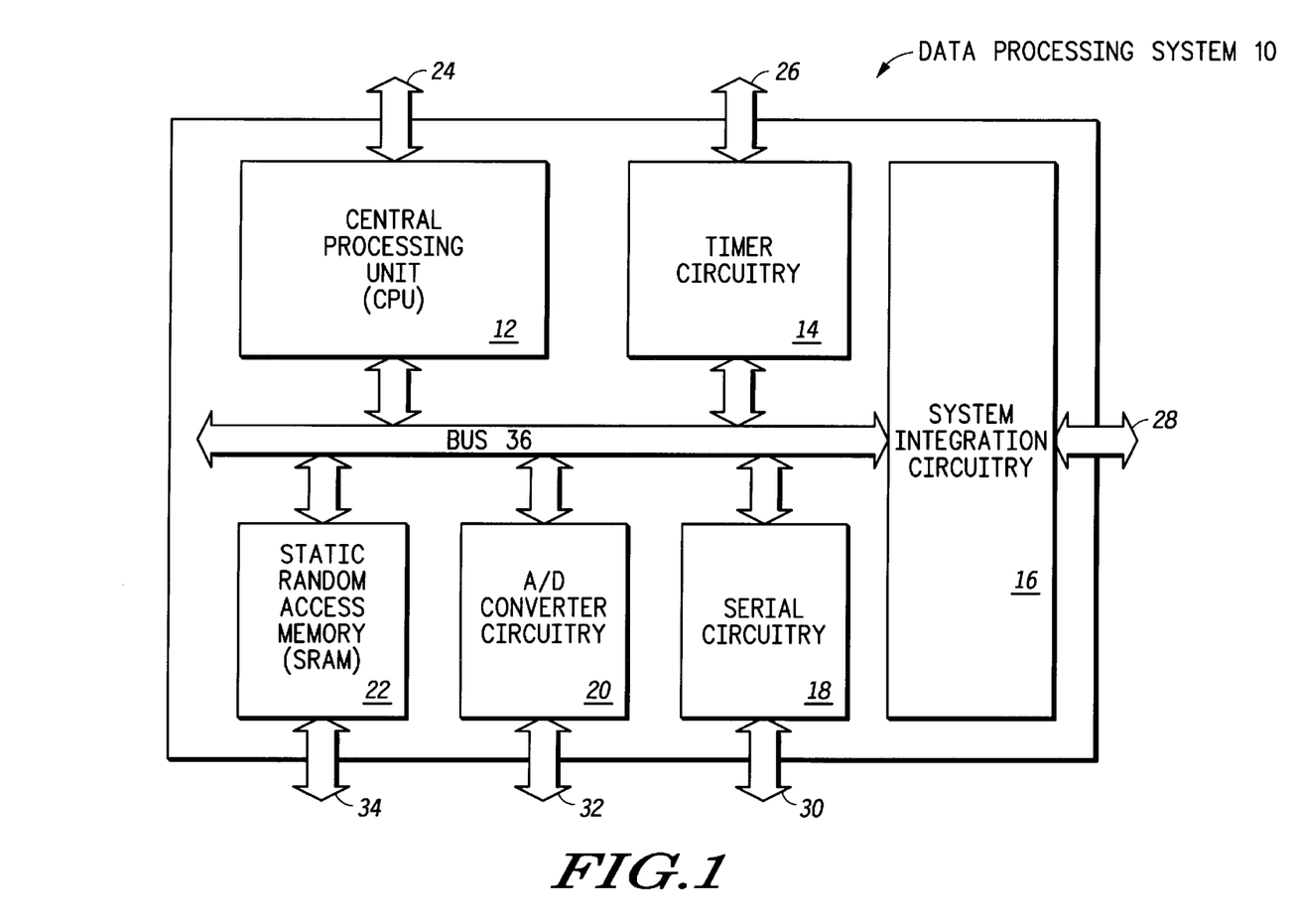
FIG. 1 illustrates, in block diagram form, a data processing system 10 in accordance with one embodiment of the present invention.

The present invention can be more fully understood with reference to FIGS. 1–6. FIG. 1 illustrates a data processing system 10 that includes a central processing unit (CPU) 12, timer circuitry 14, system integration circuitry 16, serial circuitry 18, A/D converter circuitry 20, and static random access memory (SRAM) 22, which are all bi-directionally coupled to bus 36. CPU 12 is optionally coupled external to data processing system 10 by way of integrated circuit terminals 24. Timer 14 is coupled external to data processing system 10 by way of integrated circuit terminals 26.

System integration circuitry 16 is coupled external to data processing system 10 by way of integrated circuit terminals 28. Serial circuitry 18 is coupled external to data processing system 10 by way of integrated circuit terminals 30. A/D converter circuitry 20 is coupled external to data processing system 10 by way of integrated circuit terminals 32. SRAM 22 is optionally coupled external to data processing system 10 by way of one or more integrated circuit terminals 34. In one embodiment, data processing system 10 is a microcomputer formed on a single integrated circuit. In one embodiment of the present invention, integrated circuit terminals 24, 26, 28, 30, 32, and 34 are integrated circuit bonding pads. In another embodiment of the present invention, integrated circuit terminals 24, 26, 28, 30, 32, and 34 are integrated circuit pins.

Figure 2:
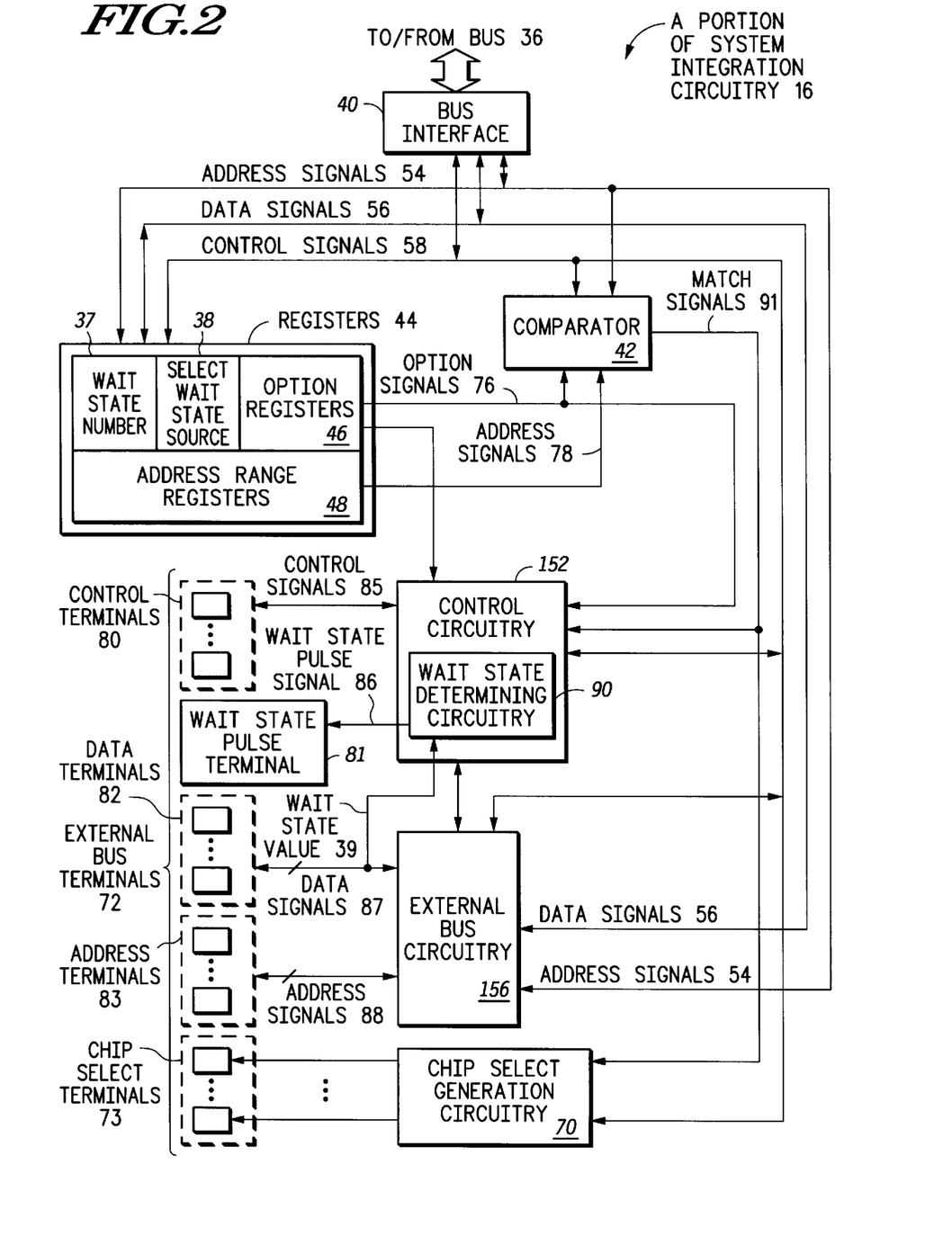
FIG. 2 illustrates, in block diagram form, a portion of system integration circuitry 16 of FIG. 1 in accordance with one embodiment of the present invention.

FIG. 2 illustrates one embodiment of a portion of system integration circuitry 16. The illustrated portion of system integration circuitry 16 includes bus interface circuitry 40 which is bi-directionally coupled to bus 36. Address signal conductors 54 are coupled to bus interface 40, comparator circuitry 42, registers 44, and external bus circuitry 156. Data signal conductors 56 are coupled to bus interface 40, registers 44, and external bus circuitry 156. Control signal conductors 58 are coupled to bus interface 40, comparator 42, registers 44, control circuitry 152, external bus circuitry 156, and chip select generation circuitry 70. Match Signals 91 are coupled to comparator 42, control circuitry 152, and chip select generation circuitry 70.

Registers 44 include option registers 46 and address range registers 48. Comparator 42 is coupled to option registers 46 by way of option signal conductors 76. Comparator 42 is coupled to address range registers 48 by way of address signal conductors 78. Comparator 42 provides a plurality of match signals 91 to control circuitry 152 and to chip select generation circuitry 70.

External bus circuitry 156 is bi-directionally coupled to a plurality of data terminals 82 by way of data signals 87 and coupled to a plurality of address terminals 83 by way of address signals 88. Chip select generation circuitry 70 is coupled to a plurality of chip select terminals 73. External bus circuitry 156 is also bi-directionally coupled to control circuitry 152.

Control circuitry 152 is bi-directionally coupled to external bus circuitry 156. Control circuitry 152 contains wait state determining circuitry 90, which is coupled to data signals 87. Control circuitry 152 is bi-directionally coupled to control terminals 80 by way of control signals 85. Control circuitry is bi-directionally coupled to wait state pulse terminal 81 by way of wait state pulse signal 86.

Chip select generation circuitry 70 is coupled to chip select terminals 73 by way of unidirectional conductors. External Bus Terminals 72 contains control terminals 80, wait state pulse terminal 81, data terminals 82, address terminals 83, as well as chip select terminals 73.

Figure 3:
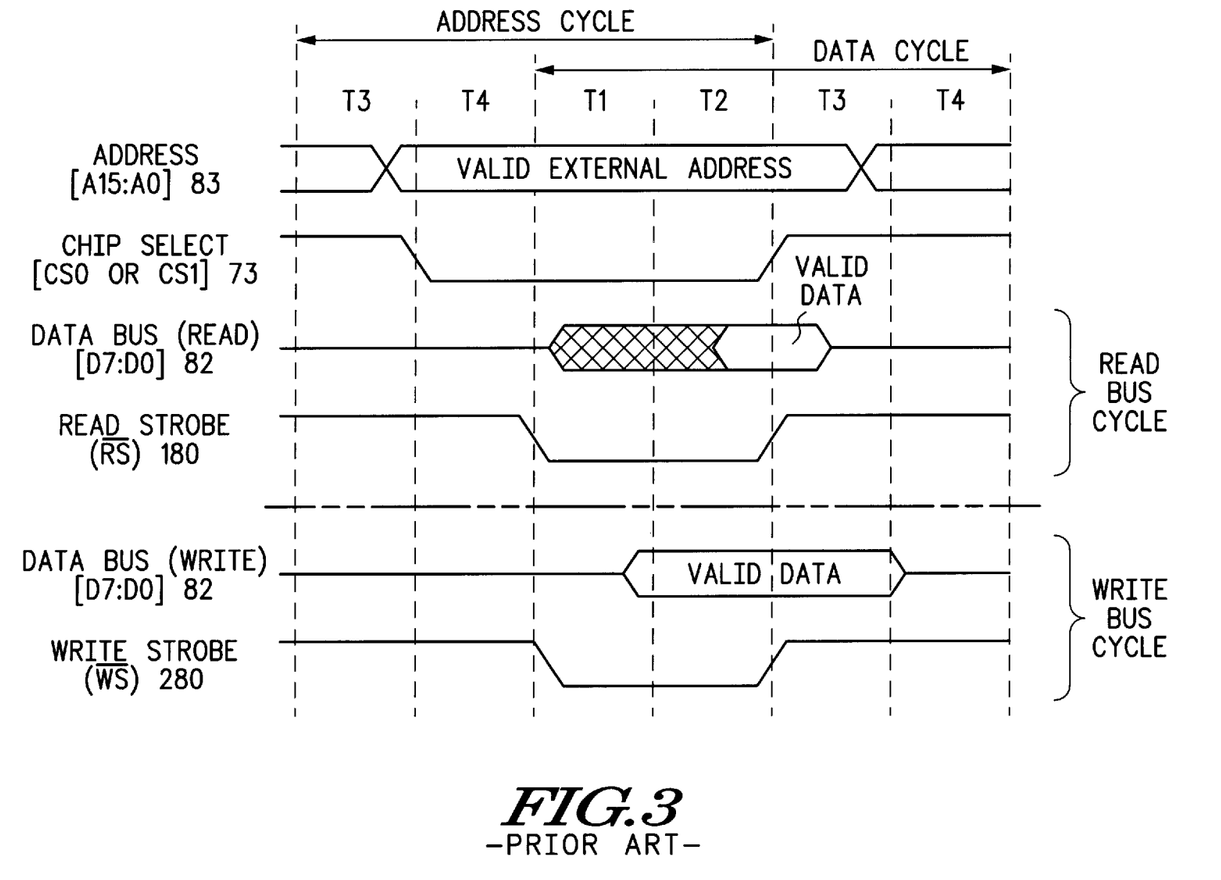
FIG. 3 illustrates, in timing diagram form, a timing scheme of signals in a prior art data processing system.

FIG. 3 illustrates the timing of data processing signals with no wait states that have been used in the prior art and which can be generated by data processing system 10 (see FIG. 1). Address terminals 83 include conductors for each bit of address [A15:A0]. In one embodiment of the present invention, data processing system 10 has a four clock operating cycling, represented by T1, T2, T3 and T4. The clock periods over which address terminals 83 provide valid address information is described as the address cycle. Referring to FIG. 3, the address cycle begins with clock T3 and continues with T4, T1, T2, and finally ending in the following T3. The corresponding data cycle defines the clock period over which data information on is valid on data terminals 82. Note that for a read access, data information is valid starting in T2 and ending in T3. Whereas, for a write access, data information is valid starting in T1 and continuing in T2, T3, and finally ending in the following T4. The timing relationship of chip select terminals 73 (including CS0 or CS1), and control terminals 80 (including read strobe 180 and write strobe 280), are also illustrated in FIG. 3.

Figure 4:
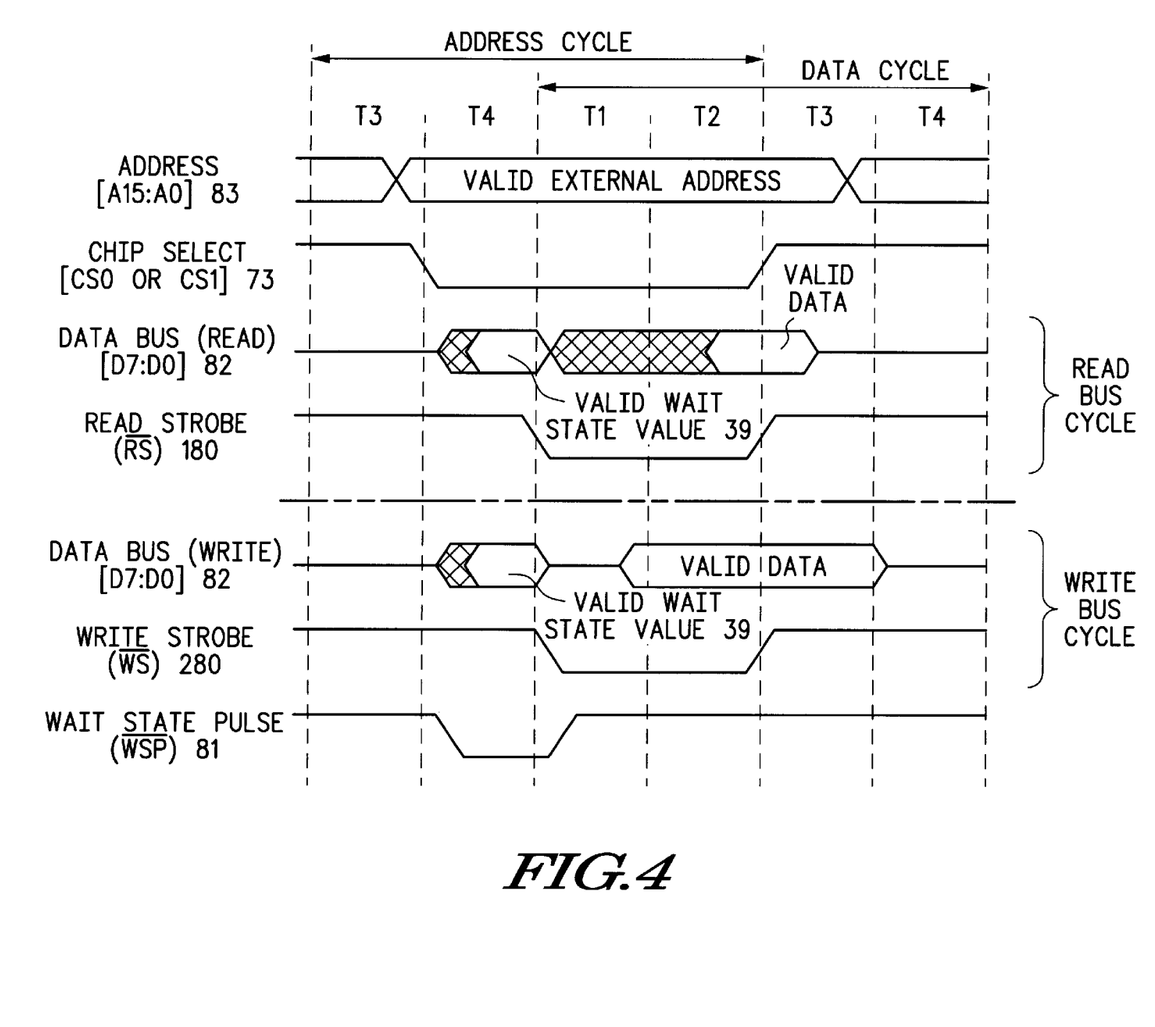
FIG. 4 illustrates, in timing diagram form, a timing scheme of signals in a data processing system 10, in accordance with one embodiment of the present invention.

FIG. 4 illustrates the timing of data processing signals where a wait state value is provided on data bus 82, in accordance with one embodiment of the present invention. As in FIG. 3, the timing relationships of external bus terminals 72 are illustrated, where address cycle describes that portion of the operating cycle during which address information is valid on address terminals 83. Likewise, data cycle describes that portion of the operating cycle during which data information is valid on data terminals 82.

Additionally, wait state pulse terminal 81 provides a wait state pulse ($\overline{WSP}$) during clock T4. Wait state value information 39 is valid on data terminals 82 during the wait state pulse. Note that wait state value information is valid during T4 for both read accesses and write accesses.

Figure 5:
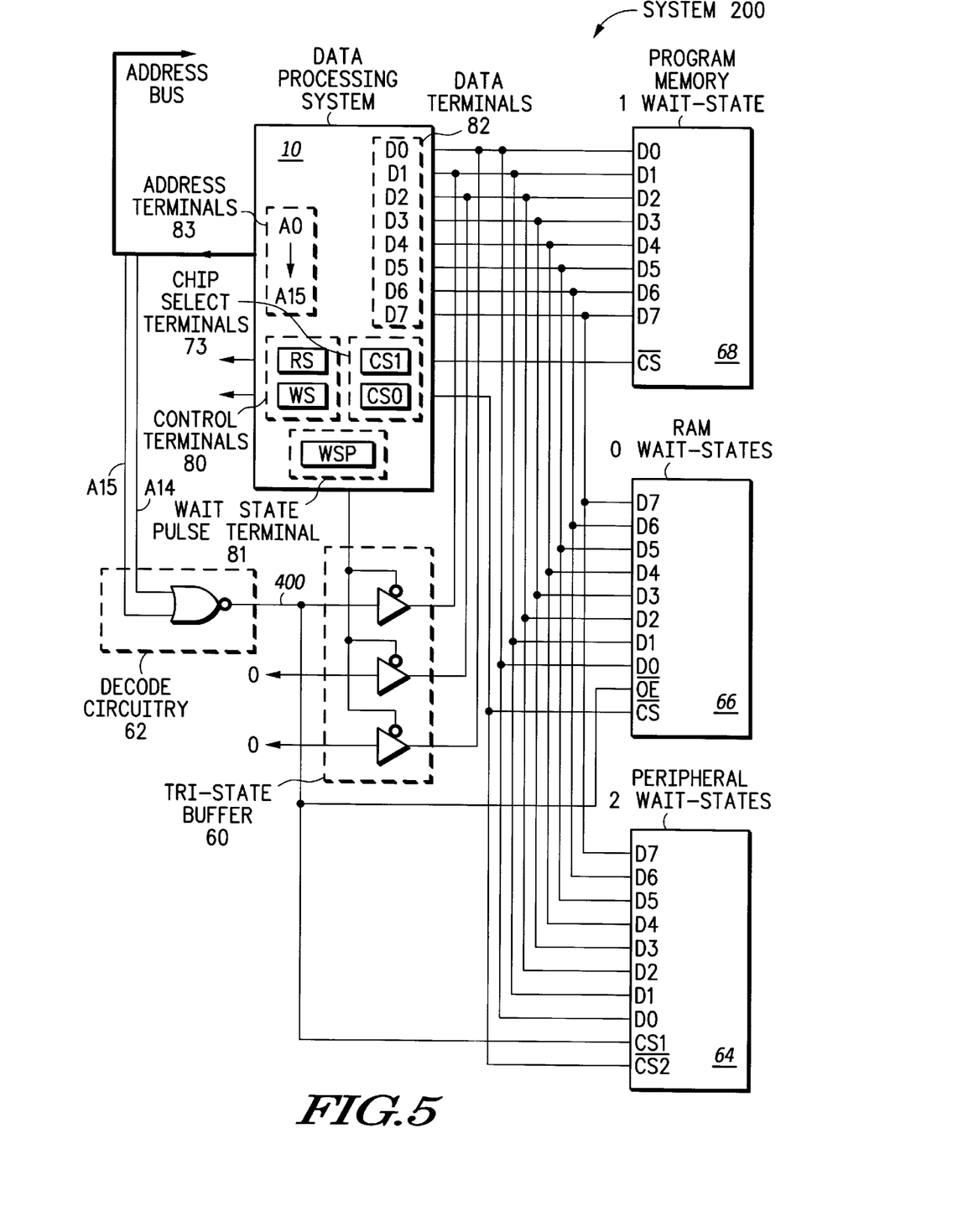
FIG. 5 illustrates, in circuit diagram form, a system 200 in accordance with one embodiment of the present invention.

Referring to FIG. 5, a system 200 using one embodiment of the present invention is illustrated. System 200 includes data processing system 10, program memory 68 requiring one wait state, random access memory (RAM) 66 requiring zero wait states, and a peripheral 64 requiring two wait states. Data processing system 10 is coupled to program memory 68, RAM 66, and peripheral 64 by way of data terminals 82 and by way of chip select terminals 73. Decode circuitry 62 is coupled to data processing system 10 by way of address terminals 83, and is coupled to tri-state buffer 60 by way of conductor 400. In one embodiment of the present invention decode circuitry 62 is coupled to RAM 66 and to peripheral 64. In one embodiment of the present invention, two of the inputs to tri-state buffer 60 are fixed at a predetermined logic level or logic state, namely logic level "0". Tri-state buffer 60 is then further coupled to data processing system 10 by way of data terminals 82 and by way of wait state pulse terminal 81.

Figure 6:
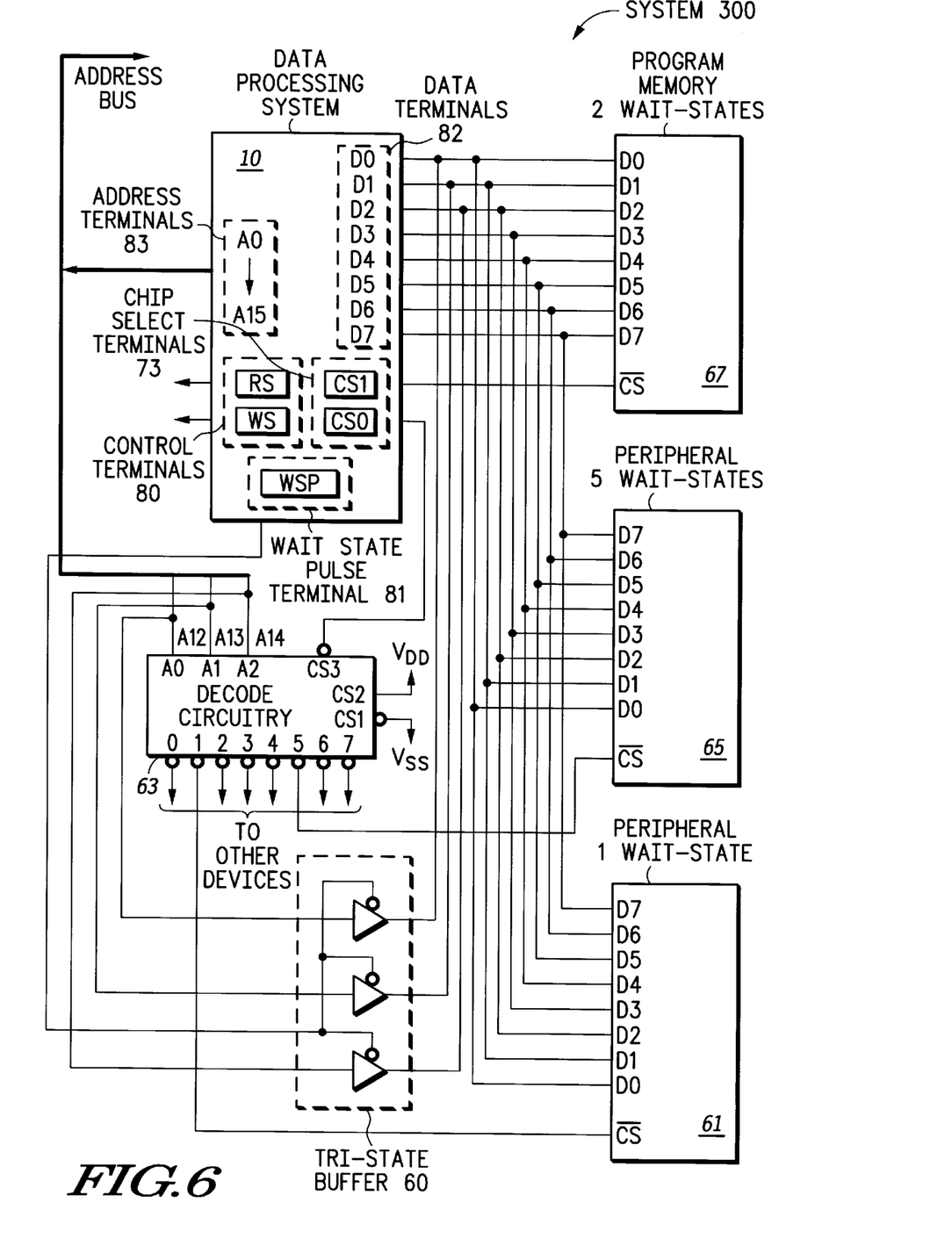
FIG. 6 illustrates, in circuit diagram form, a system 300 in accordance with one embodiment of the present invention.

Referring to FIG. 6, a system 300 using an alternate embodiment of the present invention is illustrated. System includes data processing system 10, program memory 67 requiring two wait states, peripheral 65 requiring five wait states, and peripheral 61 requiring one wait state. Data processing system 10 is coupled to program memory 67 by way of data terminals 82 and by way of chip select terminals 73. Data processing system 10 is coupled to peripheral 65 and peripheral 61 by way of data terminals 82. Decode circuitry 63 is coupled to data processing system 10 by way of address terminals 83 and chip select terminals 73. Decode circuitry is then coupled to other devices, peripheral 65, and peripheral 61. Data processing system 10 is coupled to tri-state buffer 60 by way of address terminals 83 and data terminals 82.

OPERATION OF THE PREFERRED EMBODIMENTS

The operation of the present invention will now be discussed. The present invention allows a data processing system 10 (see FIG. 1) to selectively insert zero, one or more wait states during each bus cycle on a per bus cycle basis. The number of wait states inserted may be determined by a wait state value provided to data processing system 10 from a source external to data processing system 10 (see FIGS. 5 and 6). Thus a data processing system 10 can increase the overall performance and speed of a system (e.g. system 200 in FIG. 5, or system 300 in FIG. 6) by selectively inserting the minimum required number of wait states (i.e. a larger number of wait states during each bus cycle accessing a slow peripheral device, and no wait states or a smaller number of wait states during each bus cycle accessing a faster peripheral device). In this manner, overall system performance is increased without wasting valuable bus time performing unnecessary wait states. Thus using the present invention, the optimum number of wait states may be inserted by data processing system 10 during each bus cycle, depending upon the speed of response of the particular peripheral device which is being accessed.

The present invention provides a way for a wait state value to be provided to data processing system 10 from external to data processing system 10 during each bus cycle. Data processing system 10 then uses the wait state value to determine the number of wait states to be inserted during that same bus cycle. In one embodiment of the present invention, the wait state value is provided to data processing system 10 by way of a portion of the data bus terminals 82 of data processing system 10. Note that for non-multiplexed busses, there is an initial portion of each bus cycle during which data is not driven on the data bus. Alternate embodiments of the present invention may use any terminals of data processing system 10 to provide the wait state value to data processing system 10. In one embodiment of the present invention, data processing system 10 generates chip select signals that are provided external to data processing system 10. However, alternate embodiments of the present invention may not use onboard chip select generation.

In one embodiment of the present invention, CPU 12 can initiate read accesses and write accesses to registers 44. Registers 44 are read and write accessible by way of bus 36, bus interface 40, address signals 54, data signals 56, and control signals 58. A user of data processing system 10 is able to program option registers 46 by writing a value to option registers 46, and is able to program address range registers 48 by writing a value to address range registers 48.

In one embodiment of the present invention, CPU 12 is able to initiate external bus cycles which use external bus terminals 72 to transfer information to and/or from external devices (see FIGS. 5 and 6) which are external to data processing system 10. For example, to initiate an external write bus cycle, CPU 12 transfers address, data, and control signals to system integration circuitry 16 by way of bus 36. In alternate embodiments of the present invention, other portions of circuitry in data processing system 10 (not shown) may initiate external bus cycles.

In one embodiment of the present invention, bus interface 40 provides the address signals from bus 36 to address signal conductors 54, transfers the data signals between bus 36 and data signals 56, and transfers the control signals between bus 36 and control signal conductors 58. Comparator 42 then performs a compare operation to compare predetermined ones of option signals 76 and predetermined ones of control signals 58. The logic states of option signals 76 are determined by the logic states of one or more predetermined control bits in option registers 46. In addition, comparator 42 also performs a compare operation to compare predetermined ones of address signals 78 and predetermined ones of address signals 54. The logic states of address signals 78 are determined by the logic states of one or more predetermined control bits in address range registers 48.

In one embodiment of the present invention, each chip select terminal 73 has a corresponding address range register in address range registers 48 (see FIG. 2). Likewise, each chip select terminal 73 has a corresponding option register in option registers 46 (see FIG. 2). In one embodiment of the present invention, chip select terminals 73 include two chip select terminals. As a result, there are two option registers 46 and two address range registers 48. One option register 46 and address range register 48 pair is associated with each one of the chip select terminals 73. Alternate embodiments of the present invention may include any number of chip select terminals 73, or no chip select terminals 73.

As an example, if the address signals 78 and the option signals 76 match for a first chip select, then the corresponding match signal, namely a first match signal transferred on conductors 91, is asserted. Likewise, if the address signals 78 and the option signals 76 match for a second chip select, then the corresponding match signal, namely a second match signal transferred on conductors 91, is asserted. In alternate embodiments of the present invention, only the address signals 78 may be compared in order assert a match signal, or only the option signals 76 may be compared in order assert a match signal.

Other control bits (not shown) in option registers 46 may be used to affect the response of system integration circuitry 16 in the event of an address and option match. For example, these other control bits (not shown) may be used to determine the required data transfer size, the required function codes, or the required timing associated with the assertion of a chip select signal on chip select terminals 73.

In alternate embodiments of the present invention, there may be additional registers in registers 44. Also, in alternate embodiments, the bit fields in registers 44 may have fewer or more bits. In addition, in alternate embodiments, the bits fields in registers 44 may be located in different registers or may be located in a different portion of the same register.

In one embodiment of the present invention, two chip select signals are provided at the chip select terminals 73 by chip select generation circuitry 70. In one embodiment of the present invention, each chip select signal has a corresponding one of the option registers 46, and that corresponding one of the option registers 46 includes a "select wait state source" bit field 38 and a "wait state number" bit field 37. If the select wait state source bit field 38 has a first value, the number of wait states inserted during the present bus cycle is determined from the wait state number bit field 37 in option registers 46. And, if the select wait state source bit field 38 has a second value, the number of wait states inserted during the present bus cycle is determined from the wait state value provided to data processing system 10 from external to data processing system 10.

As an example, a slow peripheral device (See FIGS. 5 and 6) can be coupled to a first chip select terminal 73 for receiving a first chip select signal. When comparator 42 determines that a match has occurred, comparator 42 asserts the match signal 91 corresponding to the first chip select signal, which is provided to control circuitry 152 and to the chip select generation circuitry 70. As a result, chip select generation circuitry 70 asserts the first chip select signal on the first chip select terminal 73. The "select wait state source" bit field 38 which corresponds to the first chip select signal is provided to control circuitry 152. Control circuitry 152 uses the select wait state source bit field 38 to select whether to use the "wait state number" bit field 37 or the wait state value 39 to determine the number of wait states to be inserted during the present bus cycle on external bus terminals 72.

In the embodiment of the present invention illustrated in FIG. 2, control circuitry 152 is used to control the transfer of control signals on control terminals 80 and is used to control the provision of wait state pulse signal 86 on wait state pulse terminal 81. External bus circuitry 156 is used to control the transfer of address signals 88 and data signals 87 on address terminals 83 and data terminals 82, respectively. The timing of these signal transfers is controlled by control circuitry 152 and/or control signals 58.

Referring now to the timing diagram in FIG. 4 illustrating use of one embodiment of the present invention, the beginning of a bus cycle is indicated by the provision of valid external addresses driven on address terminals 83. Note that the data bus and data terminals 82 are not required during the initial portion of the bus cycle indicated by time period T4. Thus that time period, T4, may be used by external logic (e.g. tri-state buffer 60 in FIGS. 5 and 6) to provide or drive a wait state value 39 back to data processing system 10. Data processing system 10 may then use that externally provided wait state value to determine how may wait states to insert during that same bus cycle.

External logic (e.g. tri-state buffer 60 in FIGS. 5 and 6) may provide a wait state value to data processing system 10 during only read bus cycles, during only write bus cycles, or during both read bus cycles and write bus cycles. In one embodiment of the present invention, a wait state pulse 81 may be used to indicate to the external logic when to drive the wait state value onto the data bus. Data processing system 10 then receives the wait state value by way of data terminals 82. Note that alternate embodiments of the present invention may drive the wait state value on any one or more terminals of data processing system 10.

Referring to the timing diagram in FIG. 4, the external logic (e.g. tri-state buffer 60 in FIGS. 5 and 6) drives the data bus 82 with the wait state value 39 when the wait state pulse 81 is asserted. Note that the address bus 83, the read strobe signal 180, and the write strobe signal 280 operate in the same manner as in the prior art. In addition, in some embodiments of the present invention, one or more chip select signals may also be provided by data processing system 10 by way of chip select terminals 73 (see FIG. 2). Although the wait state pulse 81 illustrated in FIG. 4 is asserted during T4, alternate embodiments of the present invention may use different timing patterns and may assert the wait state pulse 81 at a different time. However, when data bus 82 is used to provide the wait state value to data processing system 10, the external logic (e.g. tri-state buffer 60 in FIGS. 5 and 6) must discontinue driving data bus 82 with the wait state value before the actual data value is driven on data bus 82, either by data processing system 10 or by an external peripheral (e.g. peripheral 64, 66, or 68 in FIG. 5).

FIG. 5 illustrates the use of one embodiment of data processing system 10 in a system 200 in which the present invention is used. In FIG. 5, the present invention is used to allow a chip select signal 0 (CS0), generated by data processing system 10, to be further decoded into multiple address spaces. In the past the problem with decoding a chip select (e.g. CS0) into multiple address spaces to select multiple peripherals was that only one wait state value programmable for that chip select (e.g. CS0) could be used with all of those multiple peripherals. The present invention allows a different number of wait states to be used with each of the peripherals that use the same chip select (e.g. CS0) as part of their address decode.

In the embodiment of system 200 illustrated in FIG. 5, the chip select signal CS0 is provided to both RAM 66 and peripheral 64. Decoder 62, which receives address lines A14 and A15, is used to decode which one of peripherals 64 and 66 are being selected during a given bus cycle. The present invention uses tri-state buffer 60 to provide a wait state value back to data processing system 10 by way of data terminal D0, D1, and D2. Note that the wait state pulse input to tri-state buffer 60 is asserted only during T4 when chip select signal CS0 is also asserted. Although the system 200 illustrated in FIG. 5 uses D0, D1, and D2 data bus terminals 82 to provide the wait state value to data processing system 10, alternate embodiments of the present invention may use any number of data bus terminals 82, or alternately may use terminals of data processing system 10 other than data bus terminals 82.

Although system 200 has been shown with only three peripherals, namely program memory 68, RAM 66, and peripheral 64, alternate embodiments of the present invention may include any number of peripherals. Likewise, these peripherals may require any number of wait states from 0 to N, where N is an integer. In alternate embodiments of the present invention, tri-state buffer 60 may be any type of logic gate or gates that have tri-statable outputs, including programmable array logic, programmable logic arrays, gate arrays, etc. Note that in FIG. 5 the chip select signal CS0 is coupled to both RAM 66 and peripheral 64, thus chip select signal CS0 is asserted when the address space of either RAM 66 or peripheral 64 is driven on address bus 83. Address lines A14 and A15 are then decoded and used to select only one of RAM 66 and peripheral 64.

In the example illustrated in FIG. 5, the binary value driven on D0–D2 is a binary value from %000 binary to %111 binary. The binary value driven on D0–D2 is used to determine the number of wait states to be provided by data processing system 10. If the binary value %000 is driven on D0–D2, then 0 wait states are inserted. If the binary value %100, corresponding to 4 decimal, is driven on D0–D2, then four wait states are inserted. Alternate embodiments of the present invention may encode the number of wait states differently on terminals of data processing system 10. What is important is that there is a predetermined mapping between the wait state values driven by the external logic (e.g. tri-state buffer 60 in FIGS. 5 and 6), and the possible number of wait states to be inserted by data processing system 10.

Referring now to FIG. 6, the present invention is utilized in system 300 to allow up to eight peripherals to be decoded using chip select signal CS0. Each of those eight peripheral may request a different number of wait states by providing a wait state value to data processing system 10 by way of data terminals D0, D1, and D2. Decode circuitry 63 is used to further decode the address space of chip select 0 into a maximum of eight sub-blocks within the address range of chip select CS0. Note that the address range registers 48 are used to programmably select the address range of chip select CS0. The mapping of address signals as inputs to tri-state buffer 60 determines the number of wait states that will be associated with each sub-block of chip select CS0's address range. As a result, each external peripheral device can be programmed to have a different number of wait states. Tri-state buffer 60 is the circuit that actually provides the wait state value back to data processing system 10 by way of data terminals D0, D1, and D2.

Although the address signals shown as inputs to decode circuitry 63 and tri-state buffer 60 are shown as address signals A12, A13, and A14, any one or more of address signals 83 could have been used instead. Alternate embodiments of system 300 may include logic gates, such as inverters, at one or more of the inputs of tri-state buffer 60. This will produce a different wait state value pattern that is provided back into data processing system 10 on data terminal D0, D1, and D2; thus causing a different number of wait states to be used with the corresponding peripheral. In addition, alternate embodiments of the present invention may count the number of ones or zeros provided on selected ones of data terminal 82 in order to determine the number of wait states to insert.

Note that although the examples illustrated in FIG. 5 and FIG. 6 have included on-board chip select signal generation, the present invention does not require the provision of on-board chip select signals; instead, address lines may be directly decoded to provide the wait state value 39 to data processing system 10. The advantage of using a chip select signal is that less decoding is required to be performed external to data processing system 10. Although the systems illustrated in FIG. 5 and FIG. 6 use a wait state pulse 81 provided by data processing system 10, alternate embodiments of the present invention may use other methods to indicate to tri-state buffer 60 when to drive the wait state value 39 on terminals of data processing system 10.

While the present invention has been illustrated and described with reference to specific embodiments, further modifications and improvements will occur to those skilled in the art. For example, in alternate embodiments of the present invention, data processing system 10 may be any type of data processing system which includes external bus terminals 72 and which provides for the selective insertion of one or more wait states on a per bus cycle basis, where the number of wait states may be provided from external to data processing system 10. In one embodiment, data processing system 10 may be a microcomputer integrated circuit. In alternate embodiments of the present invention, data processing system 10 may have different blocks of circuitry than those illustrated in FIG. 1. In addition, in alternate embodiments of the present invention, external bus terminals 72 may not be included as part of system integration circuitry 16, but may be located anywhere in data processing system 10. Alternate embodiments of the present invention may be used with a wide variety of non-multiplexed bus types, including fixed transaction, pipelined, and non-pipelined, as well as other bus types.

Note that in alternate embodiments of the present invention, chip select generation circuitry 70 and chip select terminals 73 may not be implemented. As a result, a selected number of wait states may be inserted during each bus cycle, but no corresponding chip select signal is asserted. Alternately, chip select generation circuitry 70 may generate chip select signals; however, chip select terminals 73 may not be implemented or may be used for a function other than transferring chip select signals external to data processing system 10.

Note that if no match signal is asserted by comparator 42 (see FIG. 2) and a bus cycle is initiated, some embodiments of the present invention default to inserting a predetermined number of wait states during the bus cycle. However, in alternate embodiments of the present invention, the default may be user programmable, or may be no insertion of wait states.

In some embodiments of the present invention, the wait state value provided to data processing system 10 may instead by an idle state value which is used by data processing system 10 to determine the number of idle states or idle clocks to insert at the end of the present bus cycle. Thus for different embodiments of the present invention, the value provided by external circuitry to data processing system 10 may be a wait state value, may be an idle state value, or may be any other type of delay signal which indicates to data processing system 10 the length of delay to be inserted. Alternate embodiments of the present invention may even provide one or more signals to data processing system 10 to indicate the type of delay (e.g. wait states, idle states, or other delays), while the delay value itself (e.g. the wait state value, the idle state value, or other delay value) indicates the length of the delay requested.

It is to be understood, therefore, that this invention is not limited to the particular forms illustrated and that the appended claims cover all modifications that do not depart from the spirit and scope of this invention.

We claim:

1. A method for determining wait states in a data processor having a plurality of address bus terminals and a plurality of data bus terminals, the method comprising the steps of:

providing a first address value external to the data processor by way of the plurality of address bus terminals during a bus cycle;

receiving a first wait state value from external to the data processor; and in response to receiving the first wait state value, providing by way of the data processor a first number of wait states corresponding to the first wait state value, wherein the first wait state value is received from external to the data processor by way of at least one of the plurality of data bus terminals.

2. A method as in claim 1, wherein the first wait state value is received from external to the data processor during assertion of a wait state signal.

3. A method as in claim 1, wherein the first wait state value is received from external to the data processor at a start of the bus cycle.

4. A method as in claim 3, further comprising the step of:

in response to receiving the first wait state value, providing a first data value external to the data processor by way of the plurality of data bus terminals for a write access and receiving a first data value from external to the data processor by way of the plurality of data bus terminals for a read access, where the first data value is associated with the first address value.

5. A method as in claim 3, further comprising the step of:

in response to receiving the first wait state value, providing a wait state pulse external to the data processor.

6. The method as in claim 1, further comprising the step of:

providing a chip select signal external to the data processor.

7. A method as in claim 6, wherein the chip select signal is provided at the start of the bus cycle.

8. A data processing system, comprising:

a processor;

a first plurality of bus terminals, coupled to said processor, said first plurality of bus terminals providing a plurality of address signals external to the data processing system;

a second plurality of bus terminals, coupled to said processor, said second plurality of bus terminals providing a plurality of data signals external to the data processing system for a write access and receiving the plurality of data signals from external to the data processing system for a read access;

wait state determining circuitry for receiving a wait state value from external to the data processing system during a bus cycle; and control circuitry, coupled to said wait state determining circuitry, said control circuitry receiving the wait state value and delaying continuation of the bus cycle for a selected number of wait states, wherein the selected number of wait states is determined by the wait state value, wherein the wait state value is received by the data processing system by way of at least one bus terminal of said first and second plurality of bus terminals.

9. A data processing system as in claim 8, wherein the wait state value is received by the data processing system by way of at least one of said second plurality of bus terminals used to transfer the plurality of data signals.

10. A data processing system as in claim 9, wherein the wait state value received by the data processing system is encoded.

11. A data processing system as in claim 8, wherein the wait state value is derived from decoding a portion of the plurality of address signals.

12. A data processing system as in claim 8, further comprising:

a wait state pulse terminal, coupled to said control circuitry, said wait state pulse terminal providing a wait state pulse signal external to the data processing system during the bus cycle.

13. A data processing system as in claim 12, wherein the wait state value is received by the data processing system when the wait state pulse signal is asserted.

14. A data processing system as in claim 8, further comprising:

chip select circuitry, coupled to said processor, said chip select circuitry providing at least one chip select signal during the bus cycle.

15. A data processing system as in claim 8, wherein the wait state value is received by the data processing system when a wait state pulse signal is asserted.

16. A method for providing wait states in a data processor having a chip select signal, a plurality of address bus terminals and a plurality of data bus terminals, the method comprising the steps of:

providing a first address value external to the data processor by way of the plurality of address bus terminals during a bus cycle;

providing a wait state pulse;

receiving a first wait state value from external to the data processor at a start of the bus cycle;

in response to receiving the first wait state value, providing by way of the data processor a first number of wait states corresponding to the first wait state value; and providing a first data value external to the data processor by way of the plurality of data bus terminals for a write access and receiving a first data value from external to the data processor by way of the plurality of data bus terminals for a read access, where the first data value is associated with the first address value.

17. A method as in claim 16, wherein the first wait state value is received on at least one of the plurality of data bus terminals.

18. A method as in claim 17, wherein the first wait state value is determined by the first address value.

19. A method as in claim 16, wherein the first wait state value is provided during the wait state pulse.

20. A method as in claim 16, wherein if the chip select signal is negated the first wait state value is ineffective and the data processor provides zero wait states.

21. A method for determining wait states in a data processor having an external bus:

providing a first address value external to the data processor by way of the external bus during a first bus cycle;

receiving a first wait state value from external to the data processor during the first bus cycle; and in response to receiving the first wait state value, providing by way of the data processor a first number of wait states during the first bus cycle;

providing a second address value external to the data processor by way of the external bus during a second bus cycle;

receiving a second wait state value from external to the data processor during the second bus cycle; and in response to receiving the second wait state value, providing by way of the data processor a second number of wait states during the second bus cycle, wherein the first number of wait states correspond to the first wait state value, wherein the second number of wait states corresponding to the second wait state value, and wherein the first and second bus cycles are contiguous.

22. A method for determining wait states in a data processor having an external bus:

provided a first address value external to the data processor by way of the external bus during a first external bus cycle;

during the first external bus cycle, receiving a first wait state value from external to the data processor by way of a predetermined portion of the external bus;

in response to receiving the first wait state value, providing by way of the data processor a first number of wait states on the external bus during the first external bus cycle;

providing a second address value external to the data processor by way of the external bus during a second external bus cycle;

during the second external bus cycle, receiving a second wait state value from external to the data processor by way of said predetermined portion of the external bus; and in response to receiving the second wait state value, providing by way of the data processor a second number of wait states on the external bus during the second external bus cycle, wherein said predetermined portion of the external bus is also used to transfer non-wait state information during the first and second external bus cycles.

* * * * *